(12) United States Patent
Li et al.

(10) Patent No.: US 9,083,226 B2
(45) Date of Patent: Jul. 14, 2015

(54) BRUSHLESS MOTOR

(75) Inventors: Yue Li, Hong Kong (CN); Jian Zhao, Shenzhen (CN); Yong Wang, Shenzhen (CN); Ya Ming Zhang, Shenzhen (CN); Yan Hong Xue, Hong Kong (CN); Mao Xiong Jiang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 471 days.

(21) Appl. No.: 13/206,843

(22) Filed: Aug. 10, 2011

(65) Prior Publication Data

US 2012/0038237 A1    Feb. 16, 2012

(30) Foreign Application Priority Data

Aug. 10, 2010   (CN) .......................... 2010 1 0251470

(51) Int. Cl.
*H02K 1/27* (2006.01)
*H02K 1/14* (2006.01)
*H02K 21/16* (2006.01)

(52) U.S. Cl.
CPC ................ *H02K 21/16* (2013.01); *H02K 1/146* (2013.01); *H02K 1/2773* (2013.01); *H02K 2213/03* (2013.01)

(58) Field of Classification Search
CPC ..... H02K 1/146; H02K 1/276; H02K 1/2766; H02K 1/2733; H02K 21/16; H02K 2213/03; H02K 1/2773
USPC .......................... 310/156.45, 156.56, 216.111
See application file for complete search history.

(56) References Cited

U.S. PATENT DOCUMENTS

| | | | |
|---|---|---|---|
| 4,445,062 A * | 4/1984 | Glaser ...................... | 310/156.59 |
| 5,939,810 A * | 8/1999 | Uchida et al. ............. | 310/156.57 |
| 6,175,177 B1 * | 1/2001 | Sabinski et al. .......... | 310/156.55 |
| 6,268,677 B1 | 7/2001 | Takabatake et al. | |
| 7,595,577 B2 * | 9/2009 | Niguchi et al. .......... | 310/216.004 |
| 7,638,920 B2 | 12/2009 | Niguchi et al. | |
| 2003/0107290 A1 * | 6/2003 | De Filippis ................... | 310/216 |
| 2005/0242677 A1 | 11/2005 | Akutsu et al. | |
| 2006/0061227 A1 * | 3/2006 | Heideman et al. ....... | 310/156.56 |

(Continued)

FOREIGN PATENT DOCUMENTS

| | | | | |
|---|---|---|---|---|
| DE | 4423840 A1 * | 1/1996 | ............... | H02K 1/28 |
| EP | 327470 A1 * | 8/1989 | ............... | H02K 1/28 |

(Continued)

OTHER PUBLICATIONS

Kajimoto et al., JP08009599A Machine Translation, Jan. 1996.*

*Primary Examiner* — Quyen Leung
*Assistant Examiner* — Eric Johnson
(74) *Attorney, Agent, or Firm* — Muncy, Geissler, Olds & Lowe P.C.

(57) ABSTRACT

A brushless motor has a stator and a rotor. The stator has a stator core and stator windings. The stator core has a stator yoke and teeth extending radially inwardly from the stator yoke. The stator windings are formed by concentrated coils wound on the teeth. The rotor has a rotor shaft, a rotor core fixed to the rotor shaft and magnets fixed in slots formed in the rotor core. Each magnet is plate shaped and extends in both axial and radial directions of the rotor and each magnet is magnetically charged across its thickness so that a rotor pole is formed between two adjacent magnets. The ratio of the radial thickness (Y) of the stator yoke to the width (T) of the tooth body is from 0.4 to 0.7.

6 Claims, 3 Drawing Sheets

(56) References Cited

U.S. PATENT DOCUMENTS

2007/0252469 A1* 11/2007 Nishiura et al. ......... 310/156.56
2007/0273241 A1* 11/2007 Niguchi et al. ............... 310/259
2008/0073995 A1* 3/2008 Niguchi et al. ............... 310/216
2009/0096308 A1* 4/2009 Staudenmann .......... 310/156.08
2010/0270100 A1* 10/2010 Ikeno et al. .................. 180/443

FOREIGN PATENT DOCUMENTS

| JP | 08009599 A | * | 1/1996 | ............. H02K 15/03 |
| JP | 11196556 A | * | 7/1999 | ............. H02K 21/16 |
| JP | 2001086673 A | * | 3/2001 | ............... H02K 1/27 |
| WO | WO 2007088919 A1 | * | 8/2007 | |

* cited by examiner

US 9,083,226 B2

BRUSHLESS MOTOR

CROSS REFERENCE TO RELATED APPLICATIONS

This non-provisional patent application claims priority under 35 U.S.C. §119(a) from Patent Application No. 201010251470.7 filed in The People's Republic of China on Aug. 10, 2010.

FIELD OF THE INVENTION

This invention relates to an electric motor and in particular, to a brushless motor having an internal permanent magnet rotor.

BACKGROUND OF THE INVENTION

A typical brushless motor of the IPM (Internal Permanent Magnet) type, comprises a stator and a rotor rotatably mounted to the stator. The stator comprises a stator core and stator windings wound about teeth of the stator core. The rotor comprises a rotor shaft, a rotor core fixed onto the rotor shaft and permanent magnets inserted into slots in the rotor core.

Magnetic leakage is a problem for an IPM brushless motor since the permanent magnets are embedded in a magnetically conductive rotor core. Furthermore, the stator core has a risk of magnetic saturation which would make it difficult to control the motor.

Hence there is desirable for an improved brushless motor of the IPM type.

SUMMARY OF THE INVENTION

Accordingly, in one aspect thereof, the present invention provides a brushless motor comprising: a stator comprising a stator core and stator windings, the stator core comprising a stator yoke and teeth extending radially inwardly from the stator yoke, the stator windings being concentrated coils wound on the teeth; and a rotor rotatably mounted to the stator, the rotor comprising a rotor shaft, a rotor core fixed to the rotor shaft and magnets fixed in slots formed in the rotor core, wherein each magnet is plate shaped and extends in both axial and radial directions of the rotor; and each magnet is magnetically charged across its thickness so that a rotor pole is formed by two adjacent magnets, wherein the ratio of the radial thickness (Y) of the stator yoke to the width (T) of the tooth body is from 0.4 to 0.7.

Preferably, winding slots are formed between adjacent teeth, the width (S) of an opening of the winding slot being less than the thickness (M) of the magnets.

Preferably, the rotor core comprises: a ring shaped inner portion fixed to the rotor shaft; a ring shaped outer portion around the inner portion, the outer portion being divided into a plurality of pole segments by the slots in which the magnets are embedded; and rib shaped connecting portions connecting the inner portion to the outer portion.

Preferably, the rotor core comprises a plurality of holes each of which is formed between two adjacent magnets.

Preferably, each hole is formed in a respective portion of the rotor core between two adjacent magnets and disposed on a radial line midway between said magnets.

Preferably, the connecting portions are radially aligned with respective holes.

Preferably, the ratio of the smallest width of the connecting portions to the outer diameter of the rotor core is from 0.1 to 0.15.

Preferably, the ratio of the outer diameter of the rotor core to the outer diameter of the stator core is from 0.55 to 0.75.

Preferably, the ratio of radial thickness (Y) the stator yoke to the width (T) of the tooth body is from 0.51 to 0.57.

Preferably, the stator comprises twelve teeth and the rotor comprises ten magnets.

Preferably, the stator windings are divided into three phases, each phase comprising a plurality of pairs of coils, each pair of coils comprising two concentrated coils wound on adjacent teeth in opposite directions.

The brushless motor of the preferred embodiment comprises a stator core having a stator yoke and a plurality of teeth extending from the yoke. The ratio of the radial thickness of the stator yoke to the width of the tooth body is specially designed to lower the risk of magnetic saturation.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
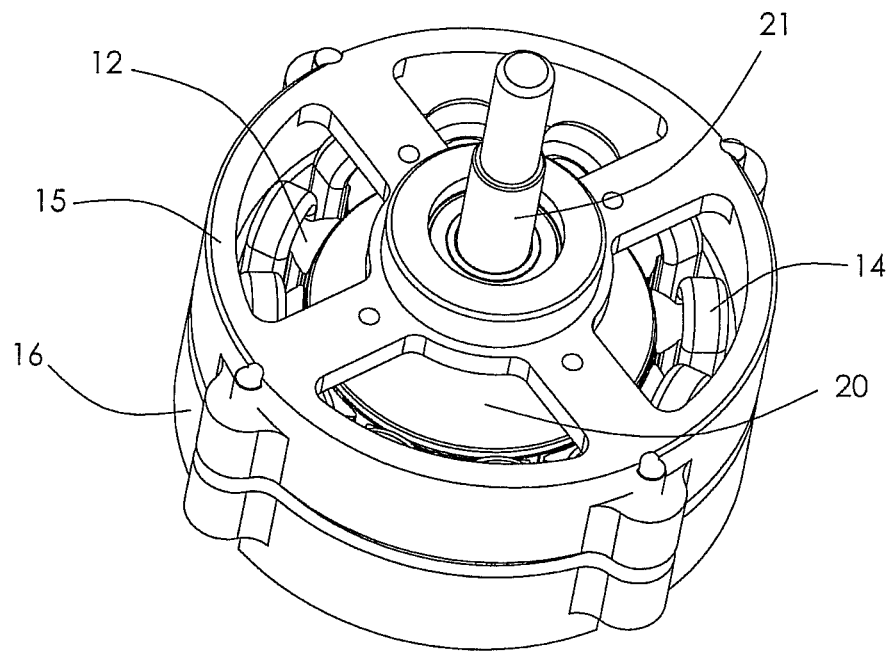
FIG. 1 is an isometric view of a brushless motor according to the preferred embodiment of the present invention.
Figure 2:
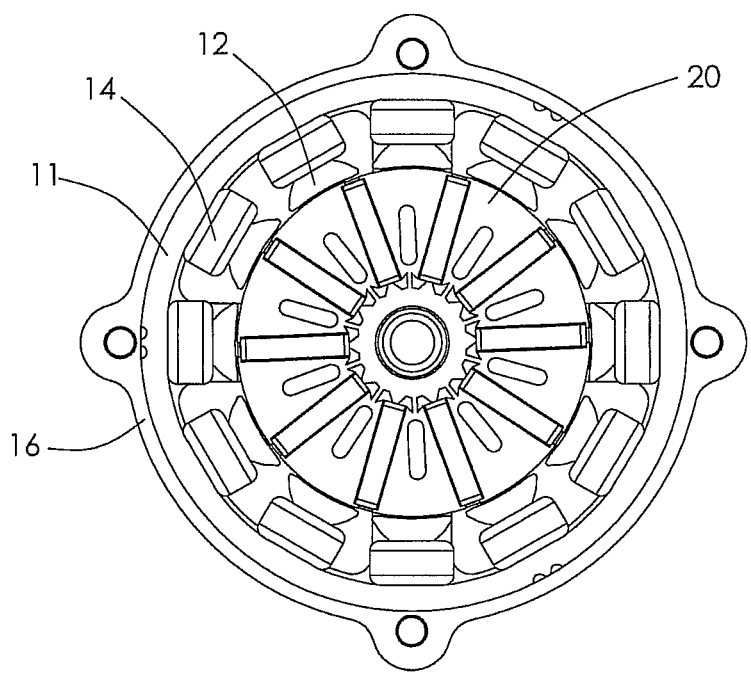
FIG. 2 is a partial plan view of the brushless motor of FIG. 1, with an end cap removed.

FIG. 1 illustrates a brushless motor according to the preferred embodiment of the present invention. The motor comprises a wound stator and a permanent magnet rotor 20 of the IPM type. The stator includes two end caps 15, 16 which form a housing for the motor. FIG. 2 shows the motor with the upper end cap removed and a cover plate of the rotor omitted. The stator comprises a stator core 10 held by the end caps, and stator windings 14 wound about teeth 12 of the stator core 10. The rotor 20 is rotatably supported by bearings fitted to the end caps.

Figure 3:
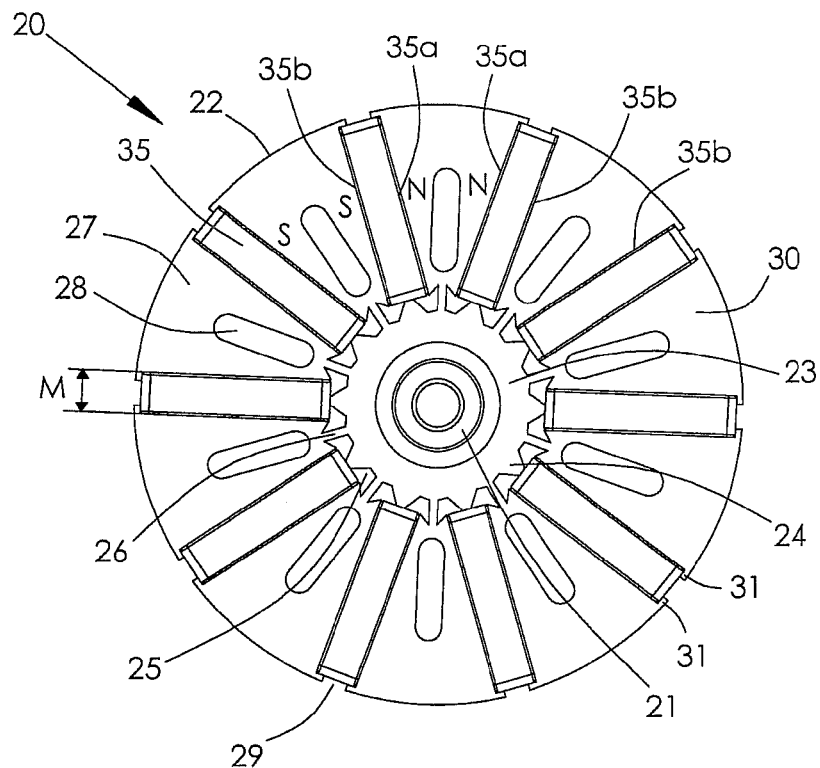
FIG. 3 is a plan view of the rotor of the brushless motor of FIG. 1, with a cover plate removed.

FIG. 3 is a plan view of the rotor 20 with cover plates omitted to show the structure of the rotor core. The rotor 20 comprises a rotor shaft 21, a rotor core 22 fixed to the rotor shaft 21, permanent magnets 35 embedded in the rotor core 22, and two cover plates (not shown) fixed to the rotor shaft 21 and disposed at respective ends of the rotor core 22. The cover plates cover the axial ends of the rotor core and are also used in the balancing of the rotor. The magnets 35 are plate shaped and are inserted into slots 29 in the rotor core 22 in the axial direction. The radial center line of each magnet 35 passes through the rotor shaft 21 or the motor axis.

As shown in FIG. 3, each magnet 35 is magnetically charged across its thickness. For instance, the surface 35a is N polarity and the surface 35b is S polarity. Adjacent surfaces of adjacent magnets 35 have the same polarity to form a rotor pole 30 there between. In the preferred embodiment, the rotor has ten magnets 35 distributed circumferentially and forming ten rotor poles 30.

The rotor core 22 comprises a ring shaped inner portion 23, an outer ring shaped portion 27 and connecting portions 26 connected between the inner portion 23 and outer portion 27. For each lamination, the inner portion 23, the connecting portions 26 and the outer portion 27 are integrally formed as one single piece. The inner portion 23 is fixed to the rotor shaft 21. The outer portion 27 is divided by radially extending slots 29 which are open at the radially outer ends between circumferentially extending fingers 31. The magnets 35 are axially inserted into the slots 29 and the fingers 31 prevent the magnets from escaping radially from the slots. The inner portion 23 comprises ten projections 24 formed at the outer edge and spaced circumferentially. The projections 24 extend into the slots 29 so as to touch or urge respective magnets 35. The projections 24 prevent the magnets moving radially inwardly within the slots and if the projections are resiliently deformed by the magnets, they urge the magnets into contact with the fingers, thereby fixing the radial position of the magnets within the slots. The outer portion 27 has ten holes 28, each of which is formed between corresponding two adjacent magnets 35. The holes 28 reduce the weight of the rotor core 22. The holes 28 cooperate with the bridge portion 26 to improve motor performance by reducing magnetic leakage to the inner portion 23 by creating areas of magnetic saturation.

Figure 6:
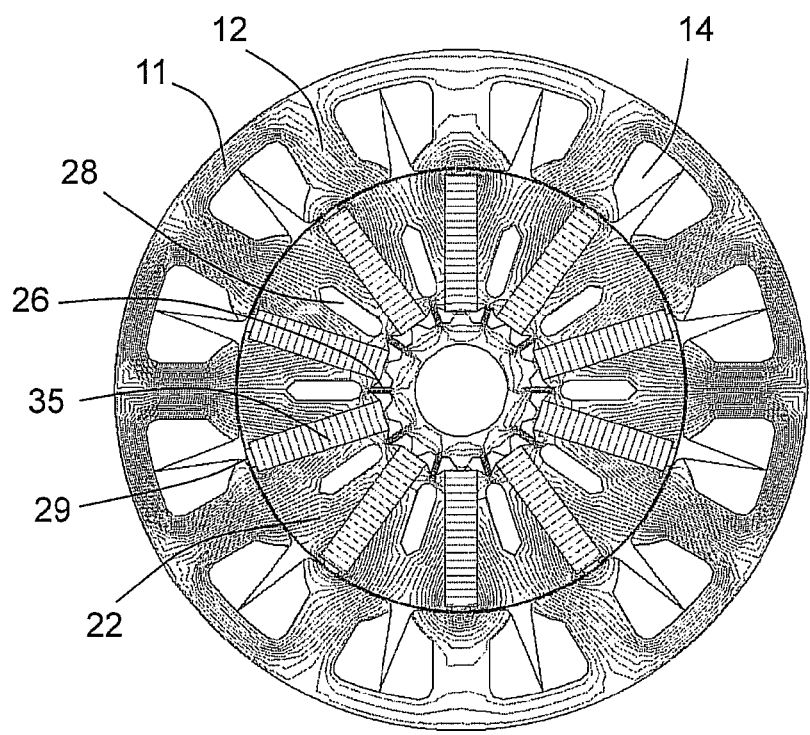
FIG. 6 is a magnetic field distribution diagram of the brushless motor of FIG. 1.

As shown in FIG. 3 and FIG. 6, preferably, each rotor pole 30 has a hole 28 formed there in. The hole 28 is preferably formed on the radial line that is mid way between the adjacent magnets forming the rotor pole. That is, a hole 28 is formed at the circumferential center of each portion of the rotor core which forms a rotor pole 30. Thus the holes 28 evenly divide and guide the magnetic field formed in the rotor poles 30 by the magnets 35. Preferably, each connecting portion 26 is radially aligned with a respective hole 28 to reduce the magnetic leakage. The connecting portions 26 and the projections 24 are arranged alternately. Smaller holes 25 are formed by respective connecting portion 26, inner ends of respective magnets 35, the inner portion 23, the outer portion 27 and the projections 24. The magnetic leakage to the inner portion 23 is further reduced due to the large magnetic resistance of the small holes 25. Preferably, the connecting portion 26 is rib shaped or strip shaped and extending radially. In the preferred embodiment, the length of the connecting portion 26 is defined by its radial dimension, the width of the connecting portion 26 being defined by its circumferential dimension, and the height of the connecting portion 26 being defined by its axial dimension. Preferably, the ratio of the width of the connecting portion 26 to the outer diameter of the rotor core 22 is from about 0.1 to 0.15. In this configuration, the connecting portions 26 have enough strength to prevent deformation while magnetic saturation is easily archived in the connecting portions 26 to reduce the magnetic leakage. The rotor with this configuration is particularly beneficial for the applications that require a motor having a speed in the range from 3,000 RPM to 20,000 RPM.

Preferably, the smallest distance from the side walls of the holes 28 to corresponding magnets 35 is from about 1.1 times to 3 times of the width of the connecting portions 26. The radial length of the magnets 35 is as long as possible, so that most of the magnetic field passes through the magnets 35. Magnetic leakage is further reduced by the open ends of the slots 29 exposing the radially outer edge of the magnets 35.

Figure 4:
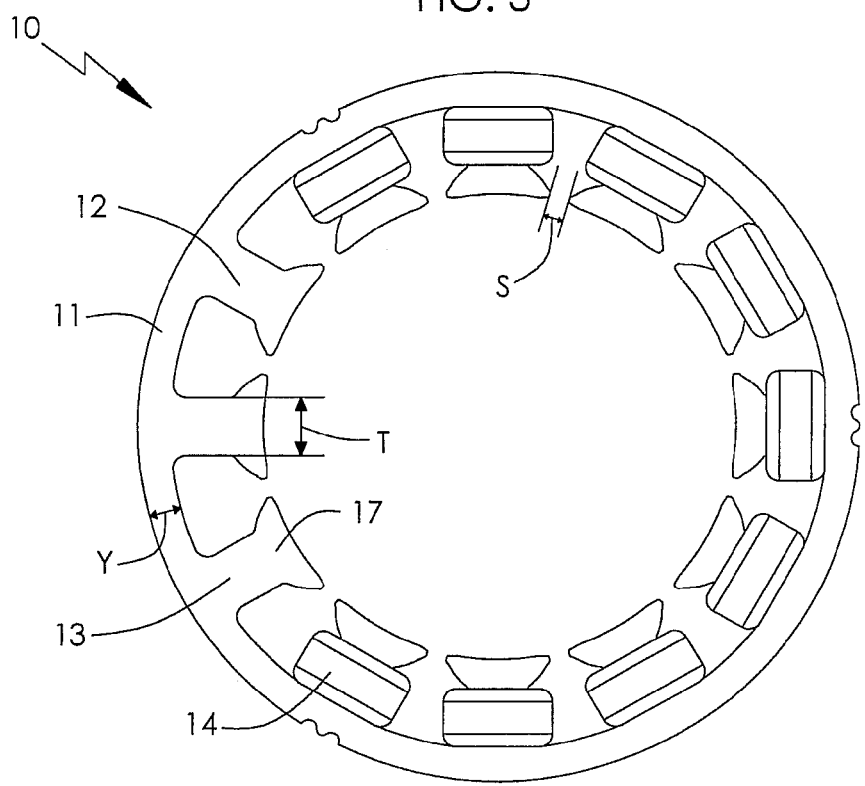
FIG. 4 is a partial plan view of the stator core and windings of the brushless motor of FIG. 1.

FIG. 4 shows the stator core 10 and the stator windings, although 3 coils forming part of the stator windings have been omitted to show the structure of the stator core. The stator core 10 is formed by stacking laminations in the axial direction. The stator core 10 comprises a ring shaped stator yoke 11 and a plurality of teeth 12 extending radially and inwardly from the stator yoke 11. The stator windings are concentrated windings, meaning that the winding is formed by a number of coils and each coil is wound about a single tooth. Thus, the stator windings comprise twelve coils 14 each of which is wound about a respective tooth 12. Each tooth 12 comprises a tooth body 13 extending radially and a crown portion 17 formed at the distal end of the tooth body. For optimizing the magnetic field distribution and reducing magnetic leakage, the radial thickness Y of the stator yoke 11 is from about 40 percent to 70 percent of the circumferential width T of the tooth body. Preferably, the ratio of the yoke thickness Y to the tooth body width T is from 0.51 to 0.57. In the preferred embodiment, the yoke thickness Y is about 5 mm, the tooth body width T is about 9 mm, and the ratio of yoke thickness Y to tooth width T is about 0.56.

Winding slots are formed between adjacent teeth 12 to receive the stator coils 14. The width S of the winding slot opening between adjacent tooth crowns 17, is preferably smaller than the thickness M of the magnets 35.

Figure 5:
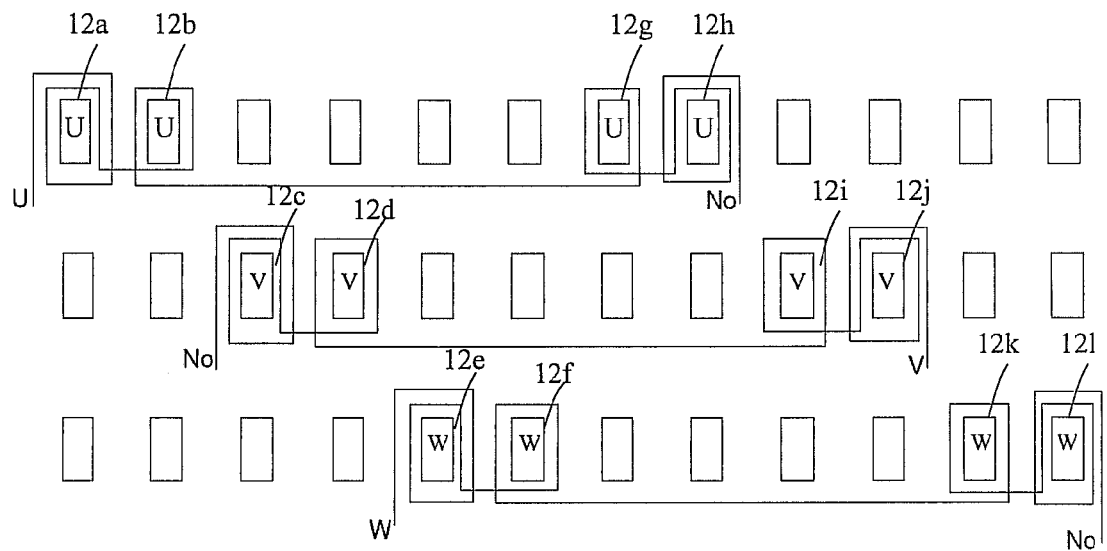
FIG. 5 is a schematic winding diagram of the stator windings of the brushless motor of FIG. 1.

Referring to the schematic winding diagram of FIG. 5, the stator windings comprise twelve concentrated coils 14 which are wound about respective teeth 12a~12l.

The twelve coils are divided into three phases, i.e., U phase, V phase and W phase. Each phase comprises two pairs of coils, each pair comprising two concentrated coils 14 wound about two adjacent teeth, in opposite directions. The two pairs of coils are diametrically arranged. For instance, U phase comprises two pairs of coils wound on teeth 12a and 12b, 12g and 12h. The pair of teeth 12a, 12b and the pair of teeth 12g, 12h are disposed at diametrically opposite locations of the rotor core 22. The coil on tooth 12a is wound in the clockwise direction while the coil on adjacent tooth 12b is wound in the counter clock wise direction. Similarly, V phase comprises two pairs of coils wound on teeth 12c and 12d, 12i and 12j. W phase comprises two pairs of coils wound on teeth 12e and 12f, 12k and 12l. The three phases are connected a star configuration, with one end of U phase, V phase and W phase being connected together at the neutral point No.

In the embodiments described above, the ratio of the outer diameter of the rotor core 22 to the outer diameter of the stator core is from about 0.55 to 0.75, and preferably 0.65. The brushless motor is particularly suitable for use in a water extractor or dryer equipment.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A brushless motor comprising:
   a stator comprising:
      a stator core comprising a stator yoke having a radial thickness and a plurality of teeth extending radially inwardly from the stator yoke; and
      a plurality of stator windings being concentrated wound on the plurality of teeth; and a rotor rotatably mounted to the stator, comprising:
   a rotor shaft,
   a rotor core including:
      a ring shaped inner portion fixed to the rotor shaft;
      a ring shaped outer portion around the inner portion and being divided into a plurality of pole segments by a plurality of slots, the outer portion defining a plurality of holes that are radially elongated, the radially elongated hole being located closer to an inner edge of the outer portion than to an outer edge of the outer portion in order to reduce magnetic leakage to the inner portion of the rotor core;
      a plurality of rib shaped connecting portions connecting the inner portion to the outer portion; and
      a plurality of pairs of additional holes respectively formed at opposite sides of the plurality of rib shaped connecting portions; and
   a plurality of magnets being respectively embedded in the plurality of slots;
wherein each radially elongated hole is located on a radial line midway between adjacent two of the plurality of magnets, and is spaced from a corresponding rib shaped connecting portion and the additional holes in a radial direction of the rotor core;
wherein each one of the plurality of rib shaped connecting portions of the rotor core is radially aligned with a respective one of the plurality of radially elongated holes;
wherein each one of the plurality of magnets is plate shaped, extending in both axial and radial directions of the rotor core, and magnetically charged across its thickness so that a rotor pole is formed between adjacent two of the plurality of magnets;
wherein a width of the plurality of rib shaped connecting portions of the rotor core is less than the smallest distance from a side wall of one of the plurality of radially elongated holes to an adjacent one of the plurality of magnets.

2. The motor of claim 1, wherein the smallest ratio of a distance from the side wall of one of the plurality of radially elongated holes to the adjacent one of the plurality of magnets to the width of the plurality of rib shaped connecting portions of the rotor core is between 1.1 and 3.

3. The motor of claim 1, wherein a ratio of an outer diameter of the rotor core to an outer diameter of the stator core is between 0.55 and 0.75.

4. The motor of claim 1, wherein the plurality of teeth of the stator core include a plurality of tooth bodies and a plurality of tooth heads, and a ratio of a radial thickness (Y) of the stator yoke to a width (T) of the tooth bodies of the plurality of teeth is between 0.51 and 0.57.

5. The motor of claim 1, wherein a ratio of the radial thickness of the stator yoke to the width of the plurality of teeth is between 0.4 and 0.7.

6. The motor of claim 1, wherein the plurality of stator windings are divided into three phases, each phase comprising plural pairs of coils, each pair of coils comprising two concentrated coils wound on adjacent two of the plurality of teeth in opposite directions.

* * * * *